United States Patent
Hellman, Sr.

[11] Patent Number: 5,118,121
[45] Date of Patent: Jun. 2, 1992

[54] COMPOUND GASKET USEFUL FOR HIGH TEMPERATURE, HIGH PRESSURE SERVICE

[76] Inventor: Robert R. Hellman, Sr., 35 Hawley Rd., Oxford, Conn. 06483

[21] Appl. No.: 644,257

[22] Filed: Jan. 22, 1991

[51] Int. Cl.⁵ .............................................. F16J 15/08
[52] U.S. Cl. ..................................... 277/209; 277/180; 277/235 R; 277/235 B; 277/236; 277/234
[58] Field of Search ............... 277/209, 235 R, 235 B, 277/236, 233, 234, DIG. 6, 207 R, 227, 180

[56] References Cited

U.S. PATENT DOCUMENTS

| | | | |
|---|---|---|---|
| 1,731,404 | 10/1929 | Wetherill | 277/207 |
| 3,061,321 | 10/1962 | Smith | 277/180 |
| 3,342,501 | 9/1967 | Meyer | 277/180 |
| 3,490,776 | 1/1970 | Avery | 277/180 |
| 4,254,963 | 3/1981 | Skrycki | 277/235 B X |
| 4,272,085 | 6/1981 | Fujikawa et al. | 277/235 B X |
| 4,300,773 | 11/1981 | Jelinek | 277/180 X |
| 4,387,904 | 6/1983 | Nicholson | 277/235 B |
| 4,535,996 | 8/1985 | Cardis et al. | 277/180 X |
| 4,625,978 | 12/1986 | Jelinek | 277/180 |
| 4,655,463 | 4/1987 | Inciong et al. | 277/180 |
| 4,728,110 | 3/1988 | Nakasone | 277/234 X |
| 4,754,982 | 7/1988 | Udagawa et al. | 277/235 B |
| 4,765,633 | 8/1988 | Hossack | 277/235 B X |
| 4,813,691 | 3/1989 | Schoenborn | 277/236 X |
| 4,878,678 | 11/1989 | Hensley et al. | 277/235 A |
| 4,891,117 | 2/1990 | Gardner, Sr. | 277/180 X |
| 4,973,067 | 11/1990 | Fritz | 277/209 X |
| 4,995,624 | 2/1991 | Udagawa et al. | 277/235 B |

FOREIGN PATENT DOCUMENTS

| | | | |
|---|---|---|---|
| 3719189 | 12/1988 | Fed. Rep. of Germany | 277/235 B |
| 0050361 | 3/1983 | Japan | 277/213 |
| 0177363 | 8/1987 | Japan | 277/235 B |
| 0077740 | 3/1989 | Japan | 277/235 B |
| 0489053 | 7/1938 | United Kingdom | 277/235 B |
| 2115503 | 9/1988 | United Kingdom | 277/235 B |

OTHER PUBLICATIONS

American Heritage Dictionary, Houghton Mifflin Co., Boston, 1982, p. 609.

Primary Examiner—William A. Cuchlinski, Jr.
Assistant Examiner—James K. Folker
Attorney, Agent, or Firm—John H. Crozier

[57] ABSTRACT

In a preferred embodiment, a compound gasket including a relatively nonresilient base member having an opening therethrough and a relatively resilient member disposed about the opening. The resilient member has a thickness somewhat greater than at least a portion of the base member so that mating surfaces between which the gasket is placed can be drawn together to contact the thickened portion of the base member so that the resilient member is compressed to a precise degree. The resilient member is freely movable with respect to the nonresilient member to better accommodate differential expansion and nonuniformities in the mating surfaces.

16 Claims, 1 Drawing Sheet

COMPOUND GASKET USEFUL FOR HIGH TEMPERATURE, HIGH PRESSURE SERVICE

BACKGROUND OF THE INVENTION

1. Field of the Invention

The present invention relates to gaskets generally and, more particularly, to a novel compound gasket which is especially useful in high temperature and high pressure service.

2. Background Art

Gaskets are well known devices for sealing between mating surfaces of opposing members such as flanges and typically are formed of a resilient or semi-resilient material, frequently of metal, asbestos, rubber, or a synthetic. The gasket material deforms slightly as the two mating surfaces are drawn together, in order to conform to imperfections in the surfaces, to compensate for non-parallel alignment of the surfaces, and, thereby, to seal the joint between the surfaces.

One problem with conventional gaskets for high temperature service is simply finding appropriate materials for the temperatures and pressures encountered. High temperatures and pressures under consideration here are pressures of about 900 psi and temperatures of about 1000 degrees Fahrenheit, or greater. A further, and related, problem with gaskets is that of controlling the degree of deformation of the gasket as the mating surfaces between which the gasket is placed are drawn together. Too little deformation can result in leakage past the gasket. Too much deformation can result in destroying the resiliency of the gasket so that cyclical temperature changes can produce leaks, as the gasket cannot expand to accommodate slight changes in distance between the mating surfaces resulting from thermal expansion and contraction or resulting from mechanical stresses.

One type of compound gasket employs a center core of asbestos with annular rings of copper or stainless steel on each surface of the gasket and having ridges around the opening in the gasket. This type of gasket is relatively satisfactory for high pressure service, since the annuli prevent the asbestos from being blown out from between the mating surfaces. However, since the asbestos takes most of the compression and it is permanently deformed, the gasket not particularly satisfactory for high temperature service and cannot be reused. Also, copper is not satisfactory for use at high temperatures.

Accordingly, it is a principal object of the present invention to provide a gasket suitable for pressures of about 900 psi and temperatures of 1000 degrees Fahrenheit, or greater.

It is a further object of the invention to provide such a gasket which is reusable.

It is another object of the invention to provide a gasket with which the degree of deformation thereof is inherently controlled.

It is an additional object of the invention to provide such gaskets which are easily and economically manufactured.

Other objects of the present invention, as well as particular features and advantages thereof, will be elucidated in, or be apparent from, the following description and the accompanying drawing figures.

SUMMARY OF THE INVENTION

The present invention achieves the above objects, among others, by providing, in a preferred embodiment, a compound gasket including a relatively nonresilient base member having an opening therethrough and a relatively resilient member disposed about the opening. The resilient member has a thickness somewhat greater than at least a portion of the base member so that mating surfaces between which the gasket is placed can be drawn together to contact the thickened portion of the base member so that the resilient member is compressed to a precise degree. The resilient member is freely movable with respect to the nonresilient member to better accommodate differential expansion and nonuniformities in the mating surfaces.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Figure 1:
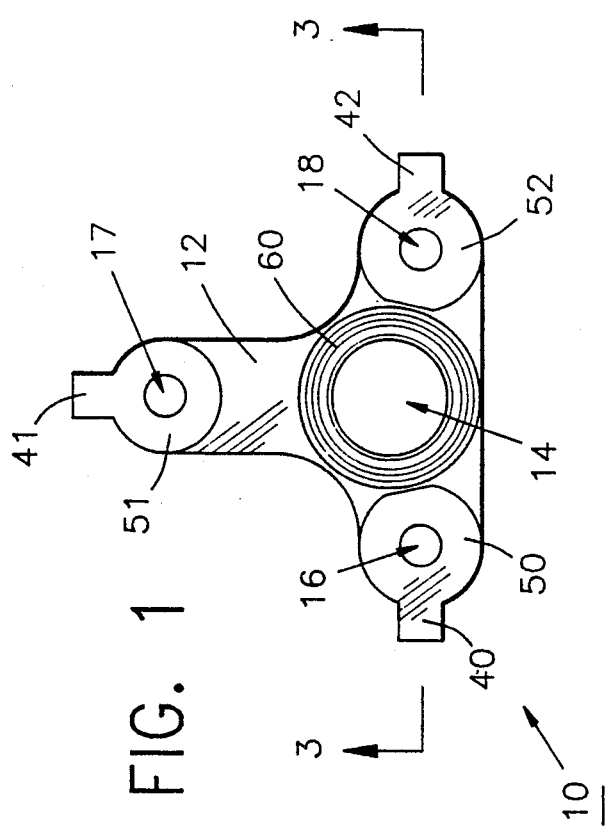
FIG. 1 is a top plan view of a compound gasket constructed according to the present invention.
Figure 3:
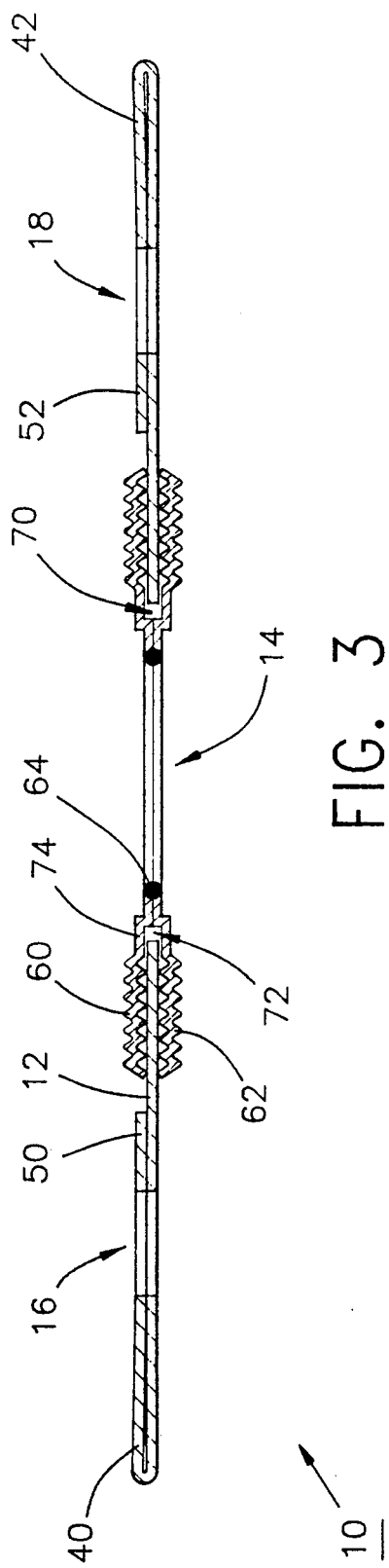
FIG. 3 is an enlarged cross-sectional view take along the line "3—3" of FIG. 1.

Referring now to the Drawing, in which similar or identical elements are given consistent identifying numerals throughout the various figures thereof, FIGS. 1 and 3 illustrate a gasket constructed according to the present invention, generally indicated by the reference numeral 10.

Gasket 10 includes a flat base member 12, formed from a relatively nondeformable material, having an opening 14 defined therethrough which may be for the passage of a fluid when in use. Gasket 10 also has defined therethrough openings 16, 17, and 18 to accommodate bolts or other fastening means (not shown) to hold the gasket in place when in use.

Figure 2:
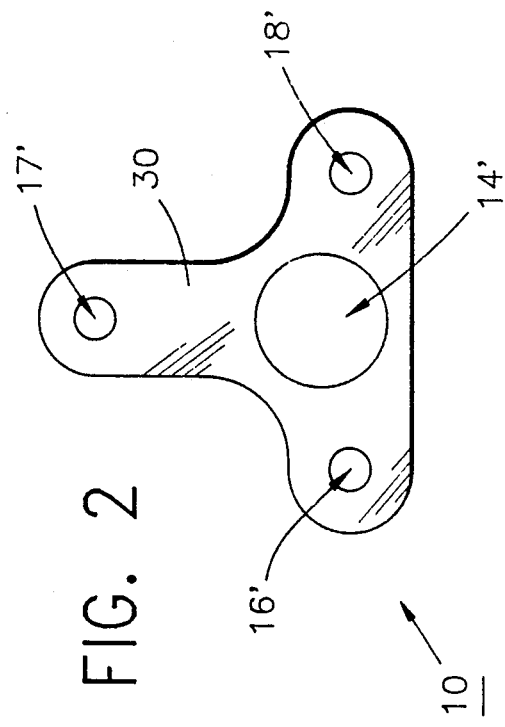
FIG. 2 is a top plan view of one of two mating surfaces between which the gasket of FIG. 1 can be used.

Referring now to FIG. 2, there is illustrated one of two identical mating surfaces 30, between which gasket 10 would be clamped when in use, the dimensions of surface 30 being identical to those of the gasket, except for tabs 40, 41, and 42 (FIG. 1) formed at the extremities of the gasket to give ready indication that the gasket is indeed installed between the surfaces. Holes 16'-18' defined through surface 30 permit locating gasket 10 in place and securing the two surfaces together by bolts or other fastening means (not shown) inserted therethrough.

Gasket 10 also includes thickened portions 50, 51, and 52 around openings 16-18 formed by folding a portion of base member 12 over on itself, the function of which will be discussed below.

Turning now particularly to FIG. 3, it can be seen that gasket 10 also includes two serrated annuli 60 and 62 placed on either side of base member 12 around opening 14 and joined by a weld bead 64 at their inner peripheries which have been bent toward each other. In the uncompressed state of gasket 10 shown on FIG. 3, it can be seen that the thickness of the sandwich structure formed by annuli 60 and 62 is somewhat greater than thickened portions 50 and 52. It should be noted from FIG. 3, that there is an annular space 70 defined between the inner periphery 72 of base member 12 and a ring shoulder 74 formed by annuli 60 and 62. It should also be noted from FIG. 3 that annuli 60 and 62 are not attached to base member 12 and that fact together with the presence of annular space 70 permits the joined annuli to freely move a certain horizontal distance with respect to the base member.

In use, gasket 10 would be placed between mating surfaces 30, and the mating surfaces drawn together by bolts or other fastening means. With the differential thickness between annuli 60 and 62 and raised portions 50-52, it will be understood that the serrations on the annuli will begin to be deformed before mating surfaces touch the raised portions. It is this aspect of the present invention that provides for controlled deformation of gasket 10. Since raised portions 50-52 are nondeformable, mating surfaces 30 can be drawn together with a substantial degree of force (which in the absence of the raised portions would overdeform gasket 10) without overdeforming the gasket. The result is that there will be a precise clearance between the mating surfaces almost regardless of the degree of tightening torque. The differential thickness can be chosen by conventional calculations based on the service conditions and the materials employed.

Having annuli 60 and 62 float with respect to the now relative immobile base member 12 permits the annuli to more easily deform to accommodate nonuniformities in mating surfaces 30 and also to accommodate differential thermal expansion.

The materials of base member 12 and annuli 60 and 62 should be compatible chemically to avoid any interaction, such as stress corrosion cracking, at the temperatures of use. For the structure shown, it has been found that base member 12 of Inconel 625 and annuli of pure nickel 200 for use at pressures of on the order of 900 psi and 1000 degrees Fahrenheit are quite satisfactory. Also, for the structure shown and the materials given above, satisfactory dimensions have been found to be: base member 12=0.006 inch thick; annuli 60 and 62=0.007 inch thick, each, before forming, and 0.025 inch total thickness with serrations; serrations=20 to 32 per inch; width of annular space 70=1/32 inch.

Because the individual serrations of nickel annuli 60 and 62 are compressible, the serrations provide for a plurality of sealing rings having high unit pressure against mating surfaces 30. Further, it has been found that, because the nickel serrations have the ability to spring back, gasket 10 can be reused many times, even under severe conditions of pressure and temperature.

While the present invention has been illustrated as having a particular configuration, it will be understood that any gasket configuration may employ the teachings of the invention and such is within the contemplation hereof.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A gasket for insertion and compression between two mating surfaces, said gasket having an opening therethrough, comprising:
   (a) a relatively nonresilient base member having upper and lower surfaces;
   (b) a relatively resilient member supported by said base member and surrounding said opening, said relatively resilient member comprising two annuli having annular serrations formed theron, the annuli being disposed on said upper and lower surfaces of said base member surrounding said opening, and the annuli being attached to each other at their inner peripheries to form a unitary structure,; and
   (c) said base member having at least one thickened portion spaced apart from said opening and said resilient member, said thickened portion having a thickness less than the thickness of said resilient member supported by said base member when said gasket is uncompressed, such that, when said gasket is compressed between said mating surfaces, said resilient member can be compressed only to the thickness of said thickened portion.

2. A gasket, as defined in claim 1, wherein said resilient member includes at least one serration surrounding said opening, said serration to be deformed by one of said mating surfaces when said gasket is compressed between said mating surfaces.

3. A gasket, as defined in claim 1, further comprising an annular clearance space provided between the joined inner peripheries of said annuli and said base member such that said attached annuli are freely radially movable with respect to said base member when said gasket is uncompressed.

4. A gasket, as defined in claim 1, wherein said base member is formed from Inconel.

5. A gasket, as defined in claim 1, wherein said resilient member is formed from nickel.

6. A gasket, as defined in claim 1, wherein said at least one thickened portion surrounds a hole defined through said thickened portion to accommodate fastening means.

7. A gasket for insertion and compression between two mating surfaces, said gasket having an opening therethrough, comprising:
   (a) a relatively nonresilient base member;
   (b) a relatively resilient member supported by said base member and surrounding said opening, said resilient member comprising two resilient elements being disposed on either surface of said base member surrounding said opening, and the elements being attached to each other at their inner peripheries to form a unitary structure; and
   (c) said resilient member being freely radially movable with respect to said base member when said gasket is uncompressed.

8. A gasket, as defined in claim 7, wherein said resilient member includes at least one serration surrounding said opening, said serration to be deformed by one of said mating surfaces when said gasket is compressed between said mating surfaces.

9. A gasket, as defined in claim 7, wherein said opening is circular and said resilient member has annular serrations formed thereon.

10. A gasket, as defined in claim 9, further comprising a clearance provided between said attached inner peripheries of said annuli and said base member to permit said radial movement.

11. A gasket, as defined in claim 7, wherein said base member has a thickened portion spaced apart from said resilient member, said thickened portion having a thickness less than the thickness of said resilient member supported by said base member when said gasket is uncompressed, such that, when said gasket is compressed between said mating surfaces, said resilient member can be compressed only to the thickness of said thickened portion.

12. A gasket, as defined in claim 11, wherein said at least one thickened portion is formed by folding a portion of said base member over upon itself.

13. A gasket, as defined in claim 11, wherein said at least one thickened portion surrounds a hole defined through said thickened portion to accommodate said fastening means.

14. A gasket, as defined in claim 7, wherein said base member is formed from Inconel.

15. A gasket, as defined in claim 7, wherein said resilient member is formed from nickel.

16. A gasket for insertion and compression between two mating surfaces, said gasket having an opening therethrough, comprising:
 (a) a relatively nonresilient base member having upper and lower surfaces;
 (b) a relatively resilient metallic member supported by said base member and surrounding said opening; and
 (c) said base member having at least one thickened portion spaced apart from said opening and said resilient member, said thickened portion having a thickness less than the thickness of said resilient member supported by said base member when said gasket is uncompressed, such that, when said gasket is compressed between said mating surfaces, said resilient member can be compressed only to the thickness of said thickened portion, said at least one thickened portion being formed by folding a portion of said base member over upon itself.

* * * * *